United States Patent [19]

King et al.

[11] Patent Number: 4,521,862

[45] Date of Patent: Jun. 4, 1985

[54] SERIALIZATION OF ELONGATED MEMBERS

[75] Inventors: Harold B. King, Wrightsville Beach; William Masaitis, Castle Hayne; Ernest Ippisch; Albert E. Chinn, both of Wilmington, all of N.C.

[73] Assignee: General Electric Company, San Jose, Calif.

[21] Appl. No.: 363,094

[22] Filed: Mar. 29, 1982

[51] Int. Cl.³ .............................................. G06F 15/20

[52] U.S. Cl. .................................... 364/552; 364/478; 364/550; 364/513; 382/8; 382/38; 382/57

[58] Field of Search ............... 364/550, 551, 552, 478; 382/8, 38, 57

[56] References Cited

U.S. PATENT DOCUMENTS

| | | | |
|---|---|---|---|
| 3,104,369 | 9/1963 | Rabinow et al. . | |
| 3,104,372 | 9/1963 | Rabinow et al. . | |
| 3,192,505 | 6/1969 | Rosenblatt . | |
| 3,278,899 | 10/1966 | Shelton, Jr. et al. . | |
| 3,333,248 | 7/1967 | Greenberg et al. . | |
| 3,349,004 | 10/1967 | Lass et al. . | |
| 3,382,153 | 5/1968 | Bigge et al. . | |
| 3,444,517 | 5/1969 | Rabinow . | |
| 3,492,646 | 1/1970 | Bene et al. . | |
| 3,581,281 | 3/1971 | Martin et al. . | |
| 3,614,736 | 10/1971 | McLaughlin et al. . | |
| 3,717,848 | 2/1973 | Irvin et al. . | |
| 3,741,868 | 6/1973 | Qurnell et al. . | |
| 3,747,066 | 7/1973 | Vernot et al. . | |
| 3,784,981 | 1/1974 | Borowski et al. . | |
| 3,792,268 | 2/1974 | Bjerke et al. . | |
| 3,810,162 | 5/1974 | Ewing, Jr. et al. . | |
| 3,816,722 | 6/1974 | Sakoe et al. . | |
| 3,846,755 | 11/1974 | Hart . | |
| 4,072,928 | 2/1978 | Wilder | 382/8 |
| 4,087,790 | 5/1978 | Neff . | |
| 4,142,293 | 10/1983 | Kelley et al. | 364/478 |
| 4,187,545 | 2/1980 | Wallace et al. | 364/552 |
| 4,199,996 | 4/1980 | Wilson et al. . | |

OTHER PUBLICATIONS

Noble & Westbrook, East Hartford Conn., no date, 3 pages, no page numbers, catalog.

*Primary Examiner*—Edward J. Wise
*Assistant Examiner*—Dale M. Shaw
*Attorney, Agent, or Firm*—Ivor J. James, Jr.; Samuel E. Turner; Raymond G. Simkins

[57] ABSTRACT

Elongated members such as nuclear fuel end plugs are provided to a robot by a vibratory feeder. The robot singly inserts the members into a character stamper or marker and then removes them and drops them down a chute to an inspection site. The member is inserted into a character reader and inspected. Unacceptably stamped members are rejected and for each accepted member the stamper is advanced to a next character. Thus, a next member is stamped with the next character, or permutation of characters, the robot already having provided a new member to the stamper.

4 Claims, 4 Drawing Figures

SERIALIZATION OF ELONGATED MEMBERS

BACKGROUND OF THE INVENTION

The instant invention deals with a new and improved method and apparatus or system for automation of serial marking or stamping of elongated members, or more particularly nuclear fuel end plugs, which plug the ends of nuclear fuel elements, rods or pins.

The security of these nuclear fuel elements, rods, or pins or portions thereof including the end plugs depends in part upon effective accountability procedures for keeping track of each such component. Accordingly, each element or component is numbered or identified with a unique sequential or serial character or string or combination of characters. The numbering or identification may be done by stamping or marking the characterization on the metal surface of the element. A convenient location for stamping or marking is the curved outer surface of the end plug portion of the fuel element.

The stamp or mark thus imprinted on the end plug may be readible or it may be somewhat difficult to read or decipher. Accordingly, the mark must be identified and the quality or sufficiency of the mark must be ascertained by inspection and poorly marked end plugs are discarded. To avoid a break or gap in the number or character sequence uniquely identifying each end plug, the marking device is only advanced or incremented to a next sequential character when an acceptably marked end plug has been produced.

An example of a device that is capable of reading or inspecting the quality of marks or characters on fuel rod end plugs is described in U.S. patent application Ser. No. 307,541 filed on Oct. 1, 1981, and involving inventors W. Masaitis et al. and assigned to General Electric Company.

The kinds of fuel elements, rods, or pins of interest herein are generally described in U.S. Pat. Nos. 3,382,153; 3,349,004; and 3,741,868 (each of them assigned to General Electric Company). Essentially, a nuclear fuel element has a hollow space which can be filled with fissile fuel such as enriched $UO_2$. The element is tubelike and plugged with end plugs at each of its ends. The elements are typically bundled in nuclear reactors and such bundles comprise the core of a nuclear reactor. Further information about nuclear reactors may be found in *Nuclear Power Engineering* by M. M. El-Wakil, published by McGraw-Hill Book Company in 1962.

OBJECTS OF THE INSTANT INVENTION

An object of the instant invention is to automate the serialization of elongated members such as for example nuclear fuel end plugs.

Another object of the invention is to remove human error from serialization procedures for elongated members.

And another object is to promote reliability in the serialization of end plugs and elongated members generally.

Even another object is to feed and manipulate end plugs with a vibratory feeder and robot system for establishing an efficient and reliable system for delivering a sequence of end plugs to a stamper without hazarding human safety.

SUMMARY

These and other objects of the instant invention are satisfied by the system and method disclosed herein which relates to the marking or stamping of a character or combination or string of characters on elongated members. The elongated member bearing the character or string is then inspected for nature and quality and retained or discarded. Retained or stored members are uniquely and serially specified by letters or numbers or another defined sequence of characters, without gaps, breaks, or omissions in sequence.

In particular, the system feeds elongated members to a robot which accepts or grabs each member and transfers it to the stamper and, after stamping, drops the member down a chute to a magazine and reader for inspection. Sorting then occurs and rejected members are dropped through a slot onto a ramp to a disposal container. For rejections, the character or character set in the stamper is not advanced, but the same characterization is stamped onto the next member fed to the stamper. Conversely, if a particular member is accepted upon inspection, it is dropped through a slot without intervention by a diverting ramp and passes into storage containers on a disc or carousel that rotates a number of storage containers below the slot. An accepted member causes the character sequence of the stamper to be advanced.

BRIEF DESCRIPTION OF THE DRAWING

To better comprehend the invention in its preferred or best mode embodiment as described below, a drawing is provided in several figures, wherein.

DESCRIPTION OF A PREFERRED EMBODIMENT

Figure 1:
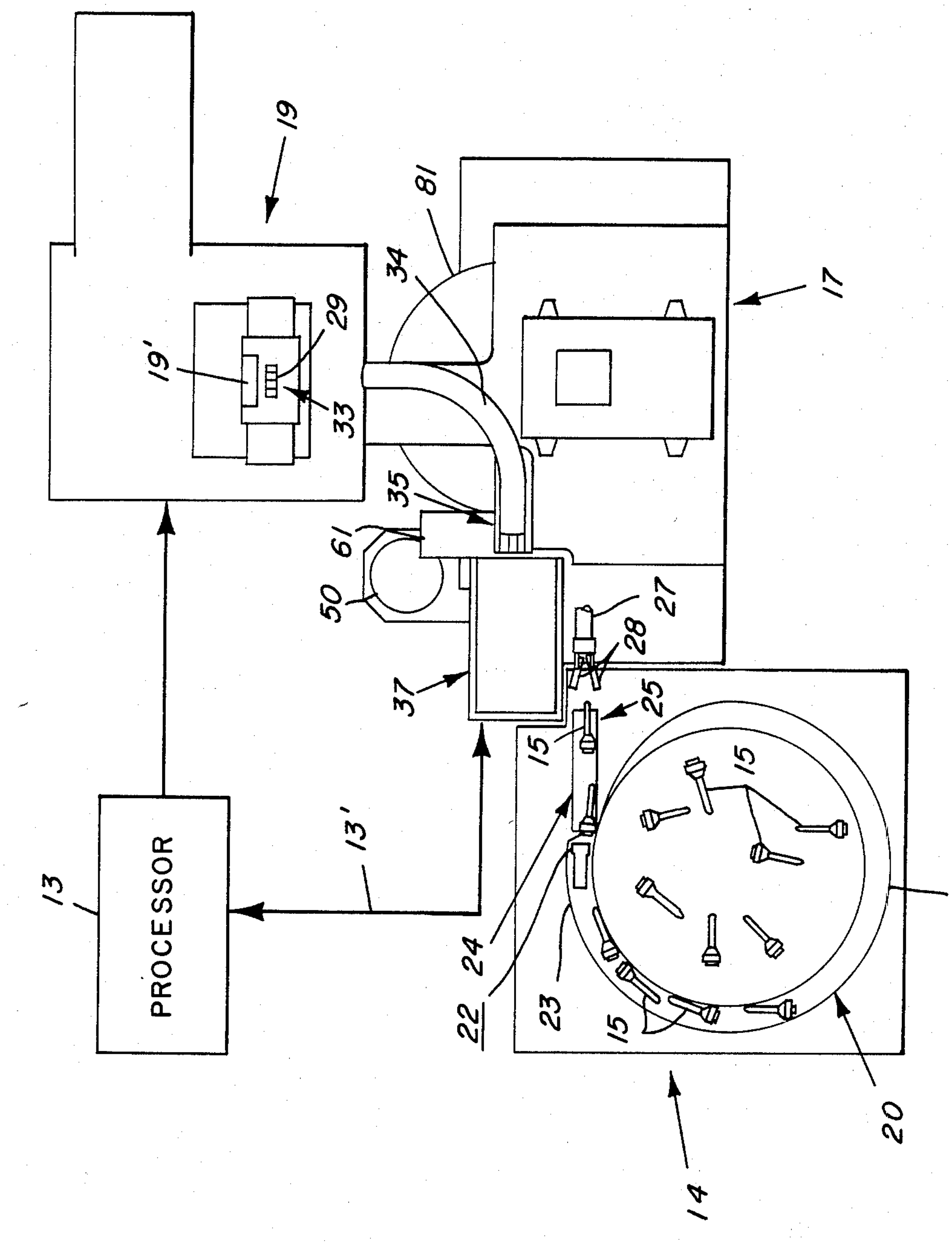
FIG. 1 provides a top view of the entire serialization system or apparatus.
Figure 2:
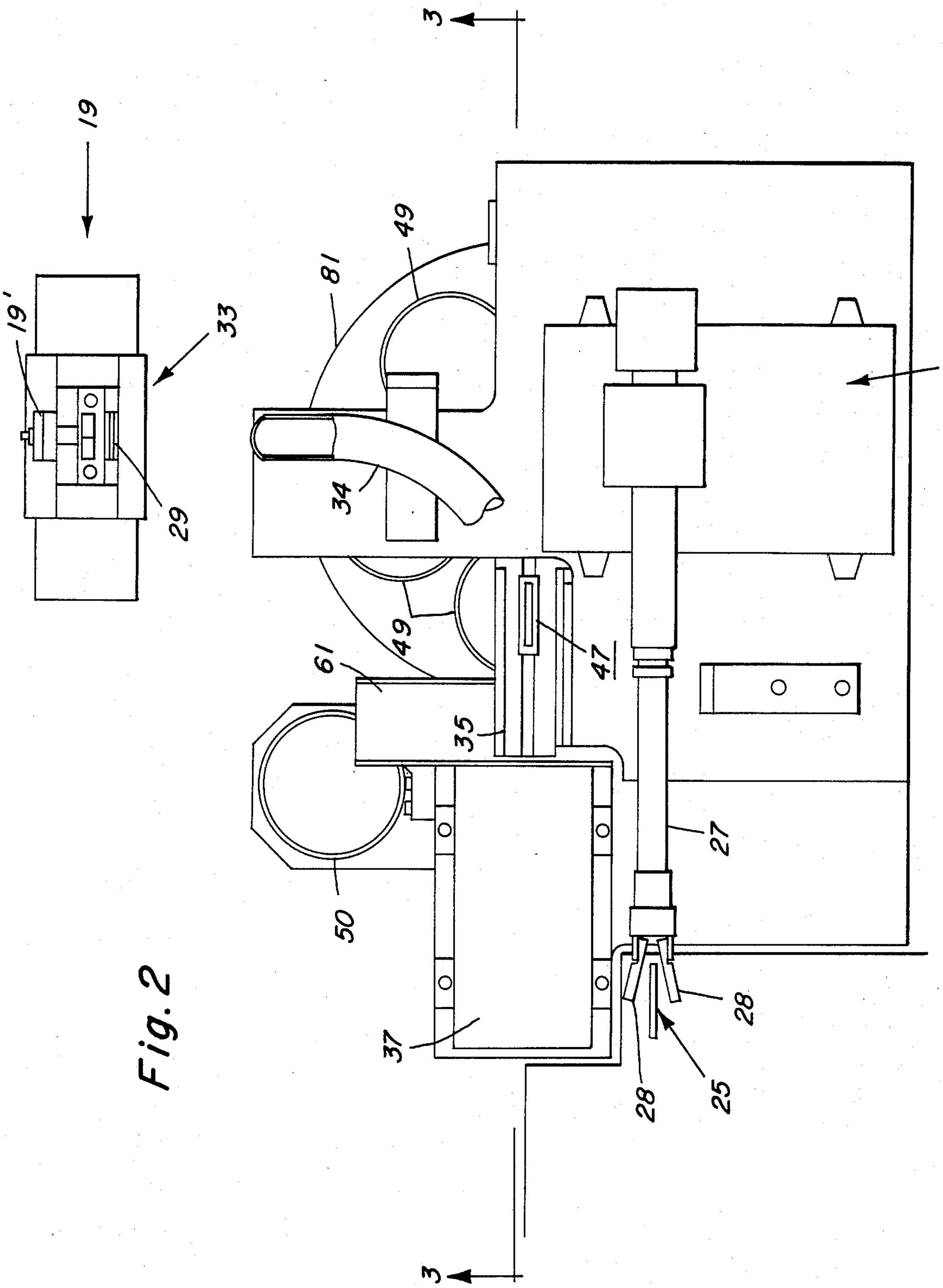
FIG. 2 is another top view of the apparatus, but one focusing more particularly on the robot for manipulating the elongated members between the feeder mechanism and the stamper. More detail is shown and the deposit chute is broken away to more clearly show the magazine at the entrance to the character reader.

FIGS. 1 and 2 show components of the overall serialization system or apparatus including a processor 13 such as for example an Intel 80/20 microprocessor for controlling operation, a feeder 14 for holding an inventory of randomly disposed elongated members 15 (such as for example nuclear fuel end plugs), a robot 17 for delivering the elongated members 15 from the feeder 14, and a marking or stamping machine, i.e., "stamper" 19 for receiving elongated members or end plugs 15 and stamping or marking them with characters individually or in a string or combination. They may have the nature of alphanumeric characters.

Figure 4:
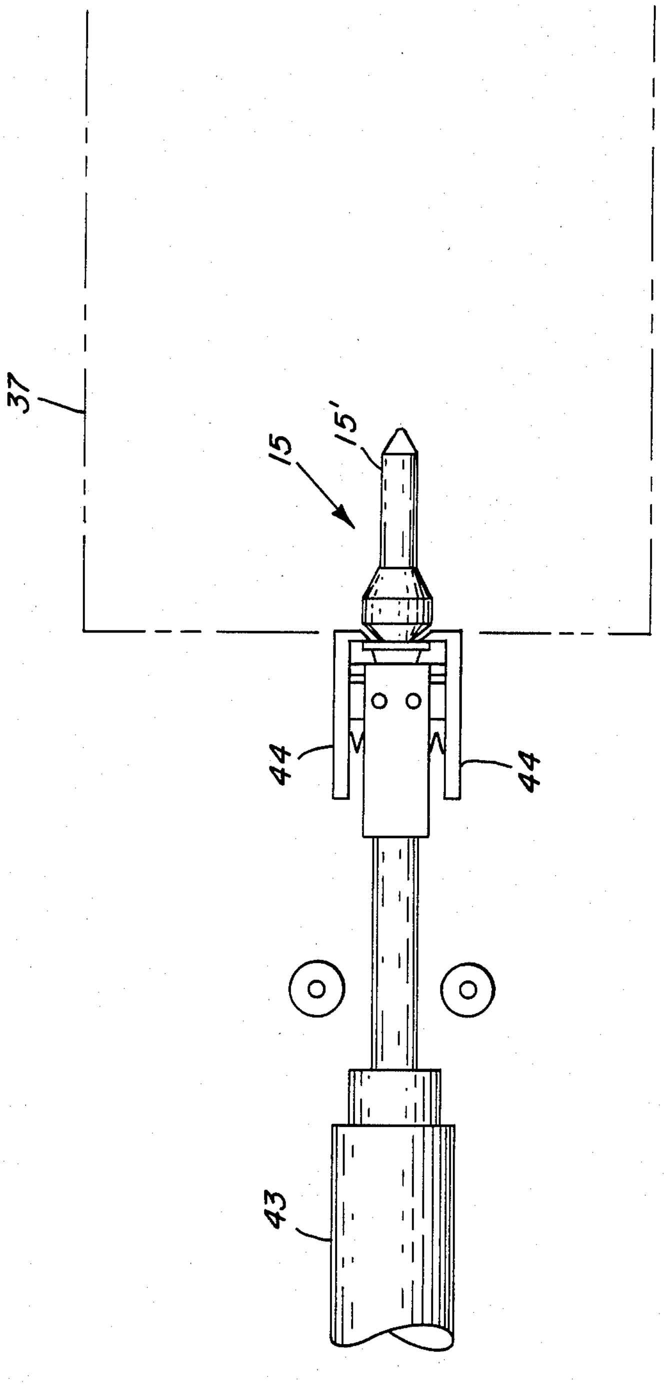
FIG. 4 shows insertion of an elongated member (e.g., a nuclear fuel end plug) into the character reader for inspection.

The feeder 14 includes a vibratory bowl 20 and a linear portion 24 including a nest 25 for offering to the robot 17 suitably oriented elongated members 15 such as the nuclear fuel end plugs already mentioned. The suitable orientation of a nuclear fuel end plug is for its smaller diameter side to be disposed toward the robot 17 while residing in the nest 25. The elongated member 15 in FIG. 4 is such a nuclear fuel end plug having a smaller diameter 15'. Note that in FIG. 4, however, the end plug 15 is being held at its larger rather than smaller diameter side.

The feeder 14 operates on the principle of lever vibration with enhanced acceleration in the direction of travel. The bowl 20 vibrates in a rotary direction and its sides are engaged for example with the upper ends of levers (not shown) subject to asymetrical vibration—that is, vibration causing a substantial acceleration in one rotary direction and a lesser acceleration in the opposite or withdrawal direction. Accordingly, the bowl is effective for centrifugally directing end plugs 15 of nuclear fuel elements to an exit location of the bowl 20 for passage to the linear portion 24 of the feeder 14. The bowl 20 offers a spiral incline 21 to the end plugs 15 and each of the end plugs 15 drops into a slot 22 at a top ramp 23 of the spiral incline 21. The slot 22 accepts the narrow portion 15' of the end plug 15 and causes the end plug 15 to hang from its head in a downward direction. As the head of the end plug 15 continues to move along the ramp 23, a widened portion of the slot 22 permits the end plug 15 to drop onto the linear portion 24, which is inclined toward nest 25, causing the tip of the end plug 15 to move to the nest first.

The nest 25 has an optical detector (not shown) which signals the processor 13 along one of suitable cables 13' to stop vibration when the end plug 15 is fully in the nest 25. Vibratory feeders applicable to this invention may be purchased for example from the firm Performance Feeder in Clearwater, Fla.

The linear portion 24 is mounted at the upper ends of other levers (not shown) which are subject to suitable vibration displaying a large forward acceleration component, and a relatively smaller reverse acceleration component. This permits the end plugs 15 to progress toward and be seated in nest 25.

The robot 17 includes an arm 27 and manipulator including fingers 28 and communicates elongated members 15 between feeder 14 and stamper 19 by repeatedly transferring single elongated members 15 from the feeder 14 to the stamper 19 by grasping the members 15 offered at nest 25 and feeding them into the mouth 33 of the stamper 19. The robot 17 may for example be a Seiko Model 700 type device with a 90 degree swing single arm and travel for positioning the manipulator. A suitable stamper 19 is a model 60 Nobel and Westbrook Serial Number Stamper with a ratchet index numerical character head subject to pneumatic indexing.

After stamping or marking, the robot 17 drops marked elongated members 15 down a chute 34, causing the elongated members 15 to fall into a magazine 35 ready for insertion into and inspection by a reader 37.

The processor 13 and reader 37 are well described in U.S. patent application Ser. No. 307,541 referred to above and relating to inventors W. Masaitis et al. The reader 37 can effectively inspect stamped or otherwise marked or characterized elongated members.

At the beginning of operation in the case of nuclear fuel end plugs, the robot 17 grasps the plug 15 from the nest 25 of feeder 14 so that its head is transferred directly into the stamper 19. Transfer by the robot 17 begins with the robot arm 27 swinging toward the linear portion 24 of the feeder 14, extending its fingers 28 to traverse the distance to the feeder 14, and grasping the end plug by its small diameter end.

The robot 17 then picks the plug out of its nest 25. The arm 27 retracts taking the plug along, and a proximity switch (not shown) indicates that the arm 27 is in its fully retracted position. The robot 17 then swings about 90 degrees around toward the stamper 19. Another proximity switch (not shown) indicates completion of the swing toward the stamper 19. After swinging toward the stamper 19, the robot 17 extends its arm 27 with the plug held in fingers 28 and deposits the plug in a cradle 29 of the stamper 19. After so depositing the plug in the cradle 29, the arm 27 of the robot 17 retracts again, and a proximity switch (not shown) provides a signal permitting actual stamping of characters onto the end plug to take place instantly.

In the particular case of a Nobel and Westbrook stamper, stamping operation involves the upward movement of the cradle 29 with the end plug suitably emplaced therein. Then, the upper side of the plug makes contact with a character stamping head 19', which is capable of holding a serially variable set of characters or permutations of characters that may be installed, set, indexed, advanced or otherwise modified by process or control signals from the processor 13. The head 19' conducts stamping by rolling across a suitable portion of the end plug, such as its head or major diameter. After the character or characters have been so marked or stamped on the end plug, the cradle 29 withdraws downward and the position of head 19' returns to a start position.

The robot fingers 28 then move in again and take the stamped plug away, picking it off the cradle 29, and retracting sufficiently to drop the plug into a curved chute 34 with the small diameter of the plug leading.

Insertion of a marked or stamped end plug into the reader 37 takes place after an end plug 15 passes through chute 34 and reaches a magazine 35 at the bottom of the chute 34. Inspection is assisted by the pushing action of pneumatic cylinder 41 (see FIG. 3) including an arm 43 including jaws or fingers 44. The arm 43 is shown retracted in FIG. 3 to a position for dropping the end plug (not shown) through a slot 47 in the magazine 35 and into one of storage containers 49. FIG. 4 shows the end plug inserted into reader 37 for inspection.

During inspection of the stamped or otherwise marked character or characters, the arm 43 of cylinder 41 holds the plug 15 fast and keeps it from rotating with the reader 37 sensing element. The reader sensing element itself goes through a series of oscillations to accomplish its scanning and to inspect the marked characters. As many as three scans are typically made of each plug. If the mark meets certain quality standards in any of the three scans (e.g., that the number is legible and that the string of characters is in line), the particular plug is classified in the category of accepted plugs. If not, the plug is considered to be a rejected plug. In each case after inspection, the particular plug is withdrawn from reader 37. Withdrawal brings the plug over a slot 47 in the magazine 35 and the fingers 44 open to drop the plug through the slot 47. In the case of "accepted" plugs, passage through the slot 47 brings the plugs to rest in storage container 49. Similarly, "reject" plugs pass through the slot 47 to a disposal container 50 as will be shown. As noted above, a suitable inspection device or reader 37 is disclosed in Masaitis et al. U.S. patent application Ser. No. 307,541 (filed Oct. 1, 1981).

More particularly, when a plug fails to achieve acceptance after three reader scans, the processor 13 directs a disposal ramp 61 to be shifted under the slot 47 to direct the plug to the disposal container 50 when it is dropped through the slot 47. At the same time, the processor 13 directs the stamper 19 to retain the character set with which the rejected plug was stamped for a further attempt to characterize an end plug with the same mark. If an end plug passes inspection, however, the processor 13 directs the stamper 19 to advance to a next character or character set.

Figure 3:
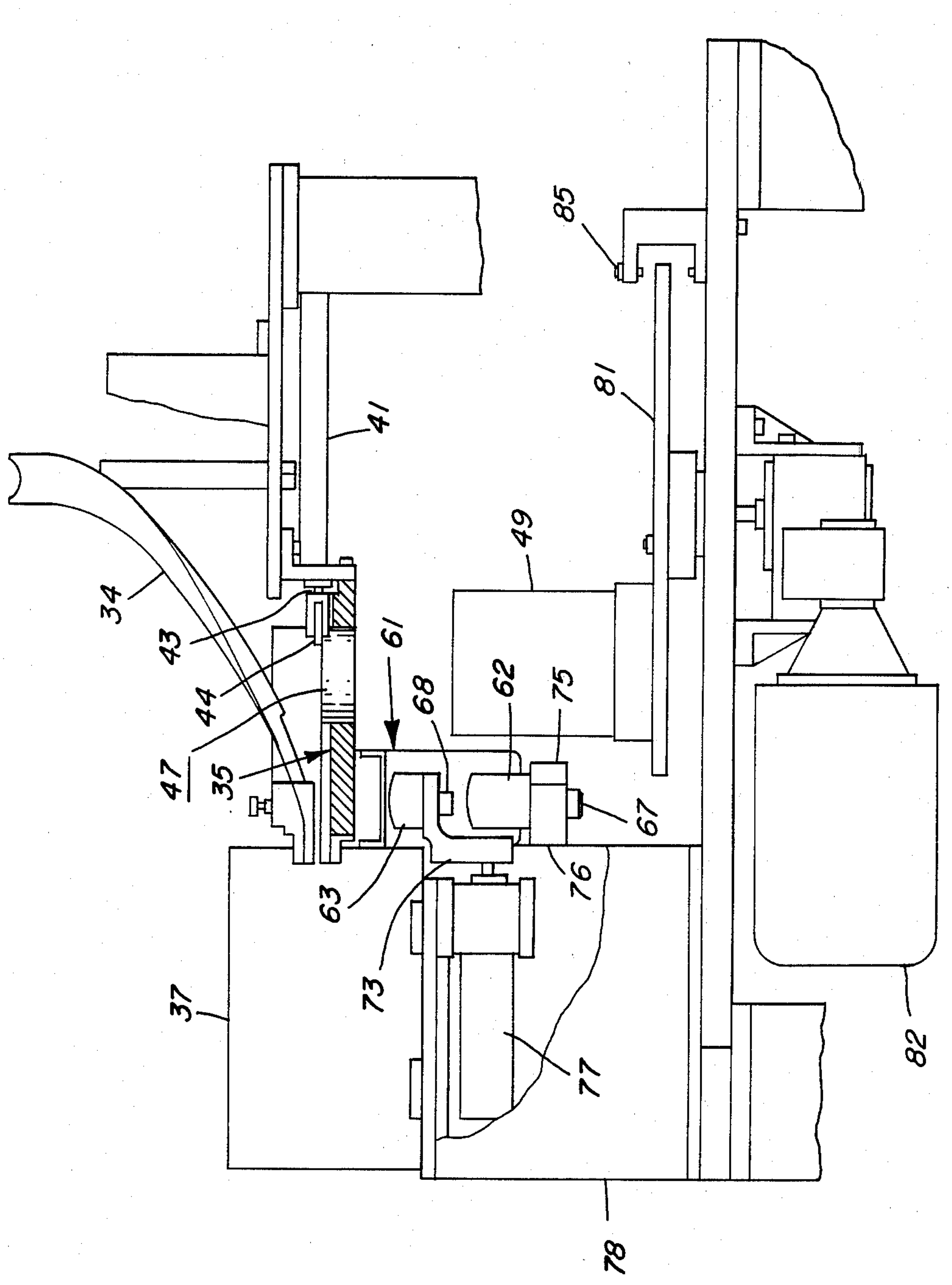
FIG. 3 is a central cross section at a vertical plane 3 indicated in FIG. 2 and effectively shows the curvature of the delivery chute and a storage container for accepted elongated members.

The physical diversion of rejected plugs passing through slot 47 is apparent in FIG. 3, which shows the ramp 61 tilted downward to the far side of the Figure. The ramp 61 rests on two supports 62 and 63 having horizontal bearing surfaces which turn with respective pivot pins 67 and 68 extending through respectively an L-shaped fitting 73 and a fixture 75 mounted on a supporting structure 76. Support 62 is centrally located in the underside of ramp 61, which extends into the background of FIG. 3.

Support 63 is in the foreground of FIG. 3 and permits the ramp 61 to pivot with pin 68, when the L-shaped fitting 73 is horizontally translated under the influence of a pneumatic cylinder 77 supported in structure 78. Support 63 rotates with pin 68 on the L-shaped fitting as the cylinder 77 positions an end of ramp 61 under slot 47 to receive rejected end plugs.

Accepted end plugs drop directly into one of the storage containers 49 without the ramp 61 being interposed. FIG. 2 shows plural storage containers 49 on a disc 81. FIG. 3 shows the disc 81 from the side and a single storage container 49 directly under slot 47. Motor 82 operates through a conventional gear mechanism to selectively rotate the disc 81 and substitutes one storage container 49 for another, as each is successively filled with a particular number of end plugs. A photoelectric switch 85 is effective for determining the disposition of the disc 81. In this manner, large numbers of elongated members 15 can be serialized.

The foregoing description is susceptible of reasonable modifications that may occur to those skilled in the art. However, this invention is not meant to be limited to the embodiment just shown and described. The claims set forth the inventive concept and are intended to cover all modifications coming within the spirit and scope of the invention described herein.

What is claimed is:

1. The method for serializing nuclear fuel end plugs comprising the steps of:

(a) feeding a plurality of said end plugs individually to an output location of a feeder means for transporting said end plugs, (b) transporting each said end plug from said feeder means by a robot including an arm and fingers, (c) marking at least a single serial character onto said end plug with a marking means for marking serial characters, (d) transferring said end plug from said marking means to an inspection site after marking has been completed, (e) conducting an inspection of the nature and quality of said at least a single serial character marked on said end plug with a reader means for inspecting said nature and quality, and (f) sorting said plurality of end plugs according to the results of the inspection in regard to nature and quality, wherein said sorting is conducted by a pneumatic means for delivering said end plugs to said reader means, including discriminating means for separating end plugs according to the results of said inspection.

2. The method of claim 1, wherein said method includes the step of advancing to a character next in seqeunce for marking each subsequent end plug only if the prior marked character meets predetermined standards of nature and quality.

3. A system for serially marking characters on elongated members comprising:

(a) a feeder device for receiving a plurality of said members and for feeding said members individually and in a predetermined orientation to an output location of said feeder device;

(b) a robot device including a movable arm and a gripper at its end for gripping the elongated member of the output location of said feeder device and transporting it to a marking location;

(c) a marking device at said marking location for marking at least a single serial character on said elongated member, said character being serially related to other characters adapted to be stamped on said member by said marking device, said marking device being adapted to advance to the next character in sequence in response to an external signal;

(d) a delivery device for transferring each marked members to an inspection site after marking has been completed;

(e) a character reader at said inspection site for conducting an inspection of the nature and quality of said at least a single serial character on said elongated member; and (f) sorting means operated in response to indications from said character reader as a result of said inspection for classifying said marking on said member into an accepted or rejected category including means for separating accepted from rejected elongated members.

4. The combination of claim 3 including a processor responsive to accept and reject indications from said character reader for signalling said marking device to advance to the next character in sequence in the event of an accept indication and to retain the present character in the event of a rejection indication whereby accepted members are marked with a series of said characters without gaps in the character sequence.

* * * * *